(12) United States Patent
Kim

(10) Patent No.: US 6,798,574 B2
(45) Date of Patent: Sep. 28, 2004

(54) PRISM DIFFUSER FOR DIFFRACTING AND SPREADING LIGHT

(75) Inventor: Man-Suk Kim, Kyounggi-do (KR)

(73) Assignee: Songsan Co., Ltd., Hwasung-shi (KR)

( * ) Notice: Subject to any disclaimer, the term of this patent is extended or adjusted under 35 U.S.C. 154(b) by 0 days.

(21) Appl. No.: 10/250,909

(22) PCT Filed: Jan. 7, 2002

(86) PCT No.: PCT/KR02/00020

§ 371 (c)(1),
(2), (4) Date: Jul. 8, 2003

(87) PCT Pub. No.: WO02/057816

PCT Pub. Date: Jul. 25, 2002

(65) Prior Publication Data

US 2004/0061959 A1 Apr. 1, 2004

(30) Foreign Application Priority Data

Jan. 18, 2001 (KR) .......................................... 2001-2813

(51) Int. Cl.[7] .............................. G02B 5/02; G02B 5/04; G02B 5/18
(52) U.S. Cl. ....................... 359/566; 359/569; 359/571; 359/574; 359/599; 359/707; 359/831; 359/837
(58) Field of Search ................................ 359/566, 569, 359/571, 574, 599, 707, 831, 833, 834, 837; 362/31, 558

(56) References Cited

U.S. PATENT DOCUMENTS

| | | | | |
|---|---|---|---|---|
| 3,718,078 A | * | 2/1973 | Plummer | |
| 4,298,249 A | * | 11/1981 | Gloor et al. | |
| 4,911,529 A | * | 3/1990 | Van De Ven | |
| 5,126,882 A | | 6/1992 | Oe et al. | |
| 5,161,057 A | * | 11/1992 | Johnson | |
| 5,303,322 A | | 4/1994 | Winston et al. | |
| 5,351,153 A | * | 9/1994 | Wakatake | |
| 5,600,455 A | * | 2/1997 | Ishikawa et al. | |
| 5,696,630 A | * | 12/1997 | Hayashi | |
| 5,914,825 A | * | 6/1999 | Nishio et al. | |
| 6,043,936 A | * | 3/2000 | Large | |
| 6,081,376 A | * | 6/2000 | Hansen et al. | |
| 6,130,777 A | | 10/2000 | Yamashita et al. | |
| 6,608,722 B2 | * | 8/2003 | Cowan et al. | |

FOREIGN PATENT DOCUMENTS

| | | | |
|---|---|---|---|
| EP | 0544332 A1 | | 6/1993 |
| WO | WO 02/057816 | * | 7/2002 |

* cited by examiner

Primary Examiner—Ricky D. Shafer
(74) Attorney, Agent, or Firm—Birch, Stewart, Kolasch & Birch, LLP

(57) ABSTRACT

The present invention relates to a prism diffuser for diffracting and spreading light, and in particular to a prism diffuser for diffracting and spreading light which is capable of spreading light in a certain direction at a wider angle based on a structure combined with a prism capable of diffracting light on a surface of a medium formed of a glass which transmits or reflect light, a film formed of a transparent synthetic resin material or a metallic plate and a diffuser capable of spreading light and diffracting, spreading and transmitting light into two directions or diffracting, spreading and reflecting light in one direction.

6 Claims, 12 Drawing Sheets

[Fig.1]
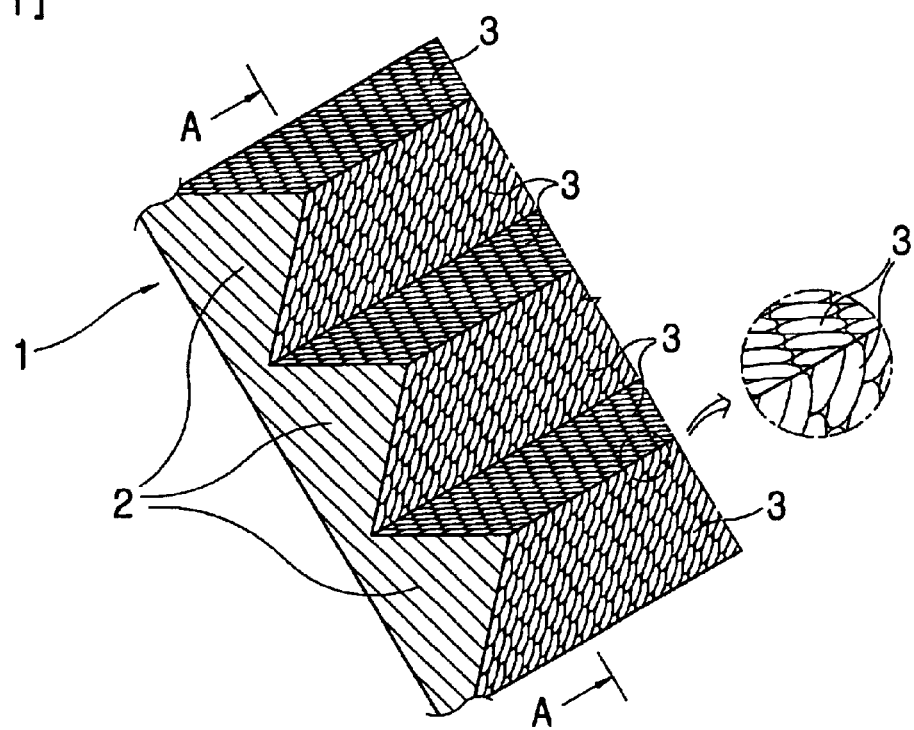
[Fig.2]
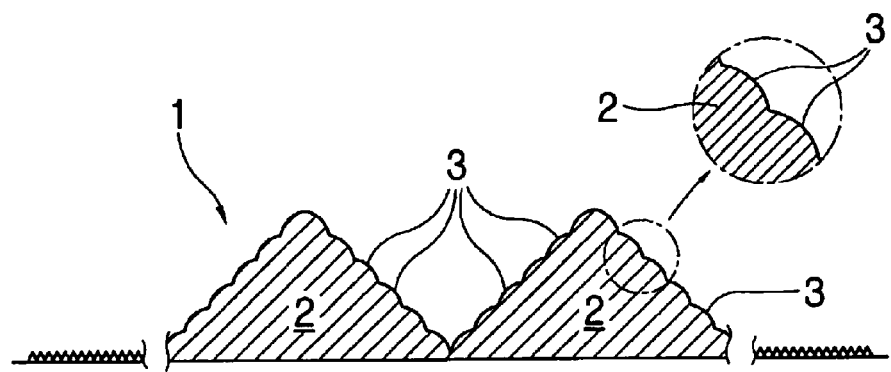

[Fig.3]
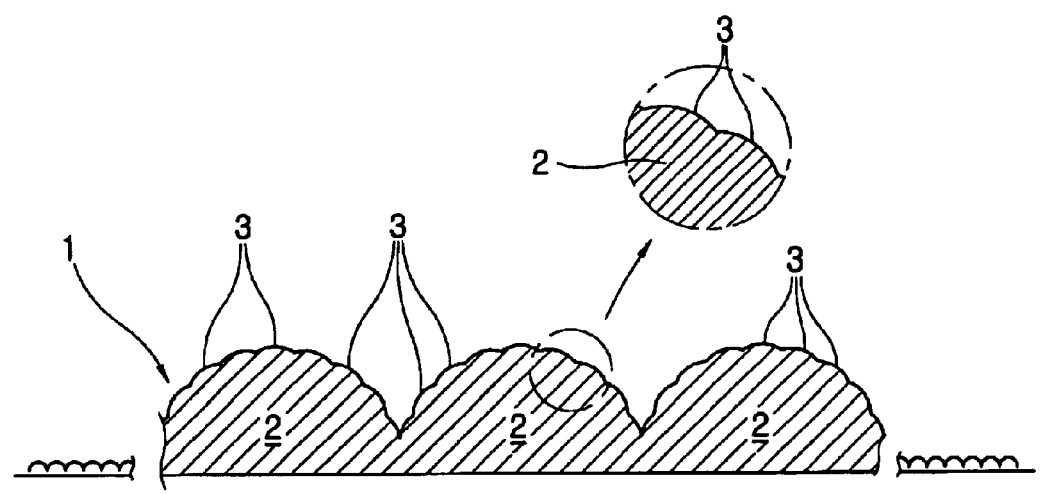
[Fig.4]
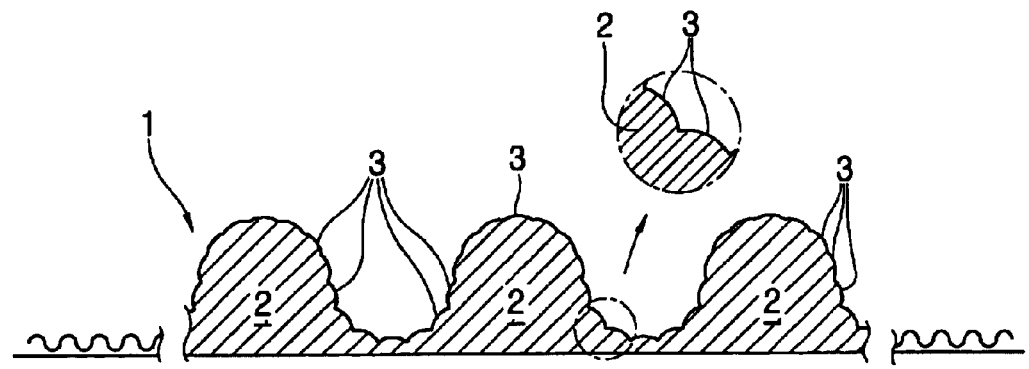

[Fig.5]
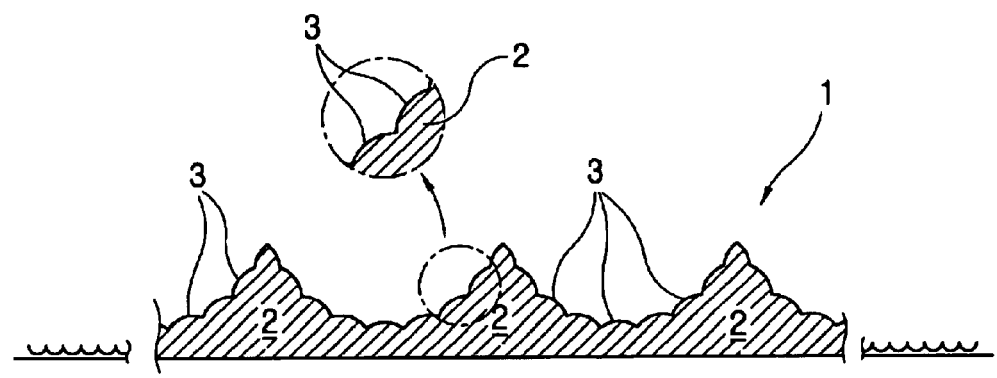
[Fig.6]
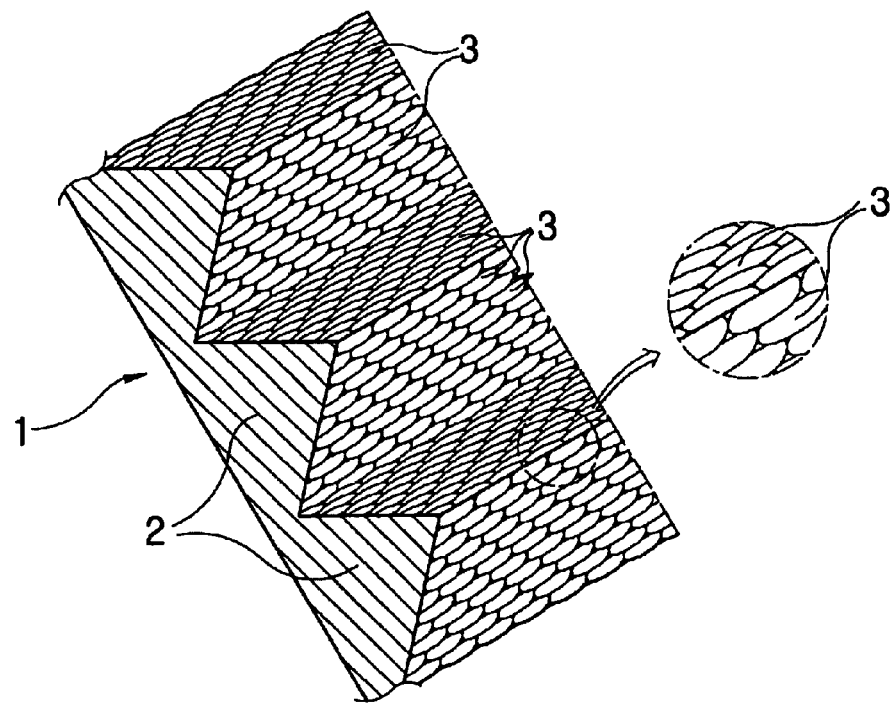

[Fig.7A]
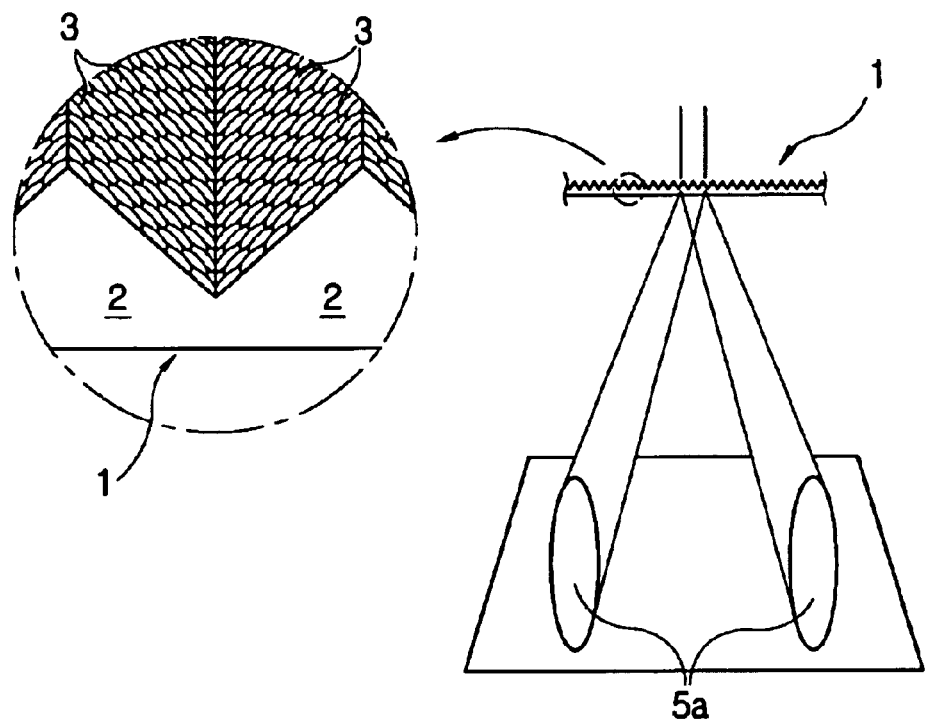
[Fig.7B]
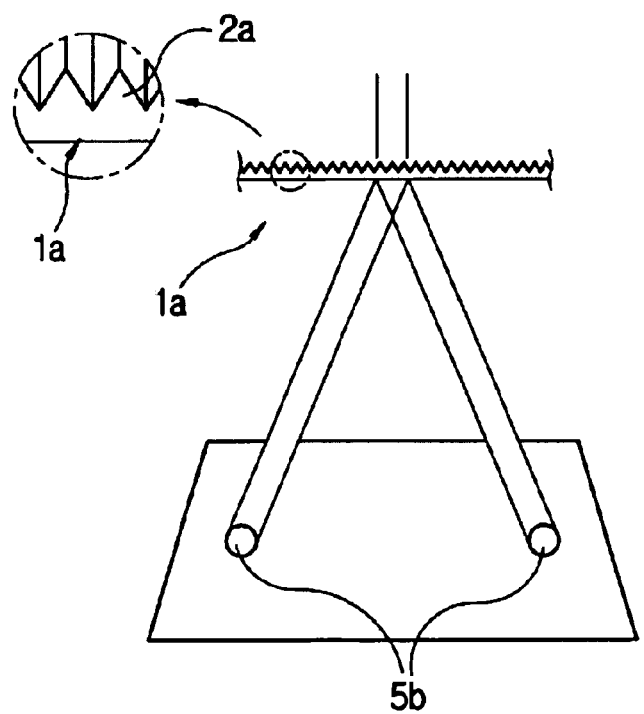

[Fig.8A]
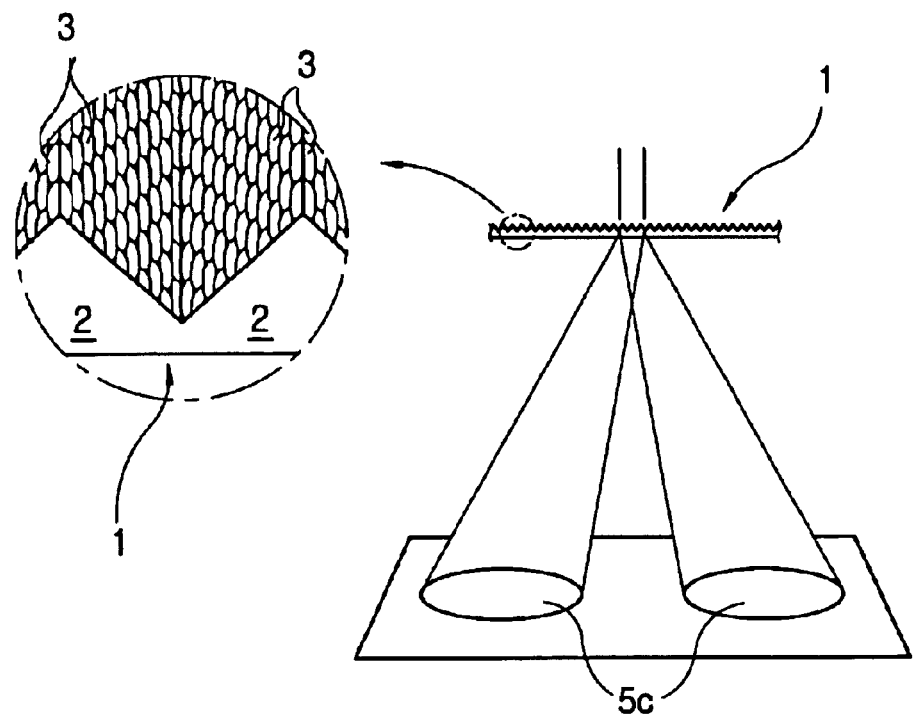
[Fig.8B]
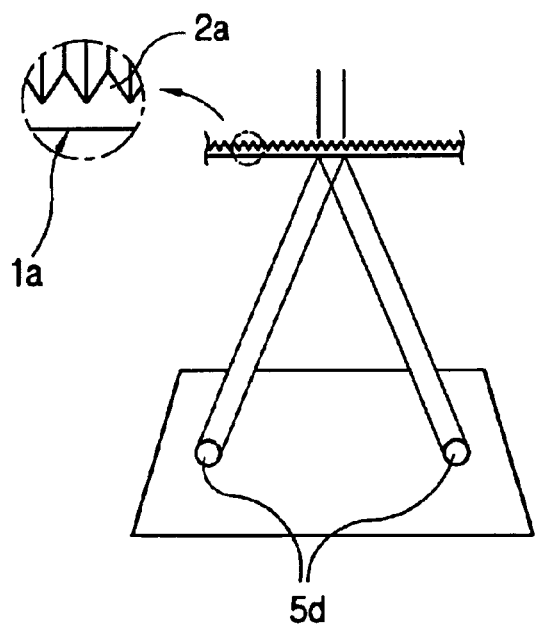

[Fig.9A]
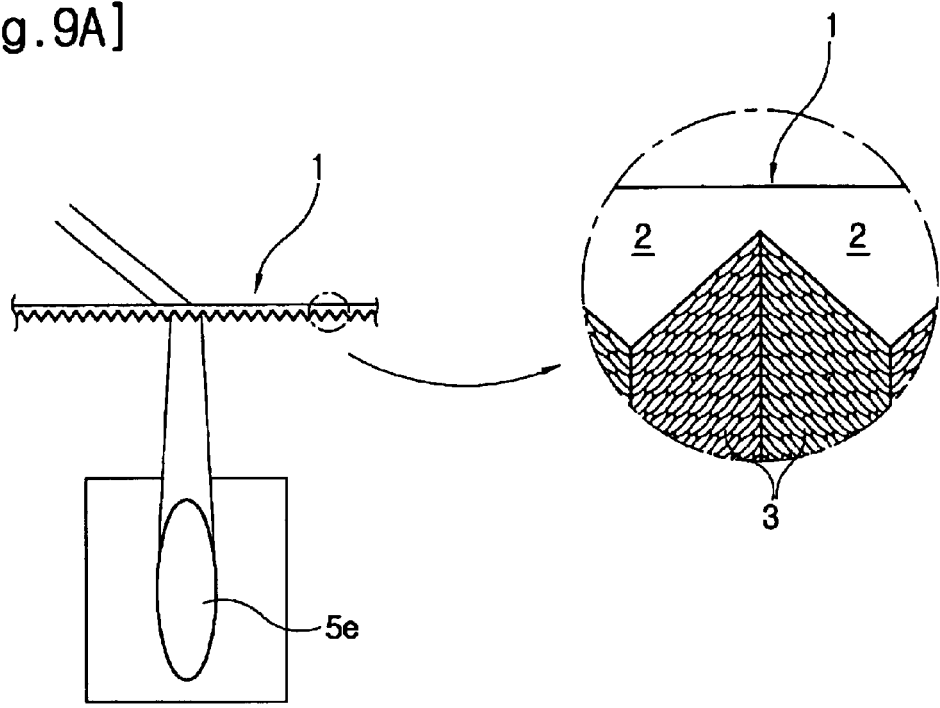
[Fig.9B]
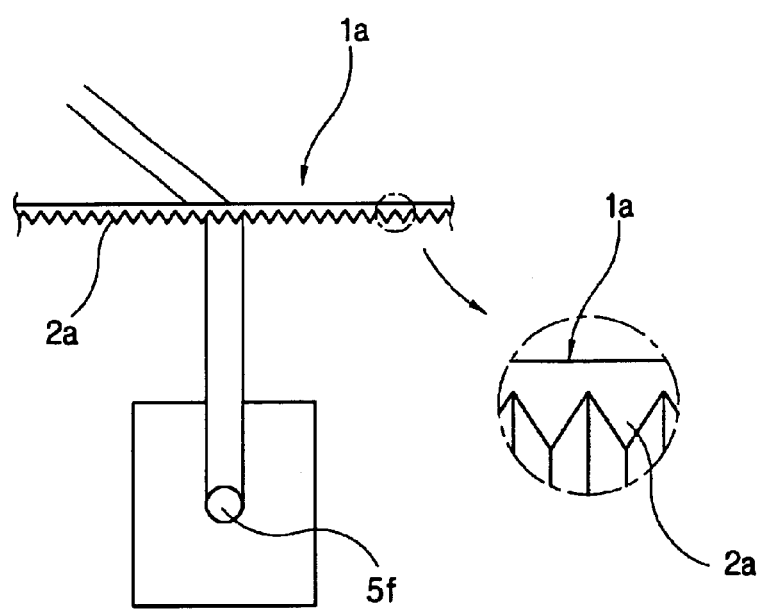

[Fig. 10A]
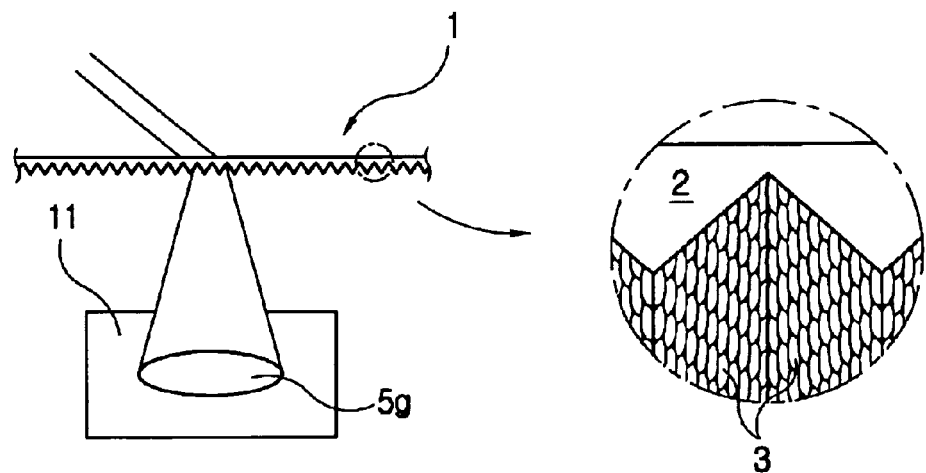
[Fig. 10B]
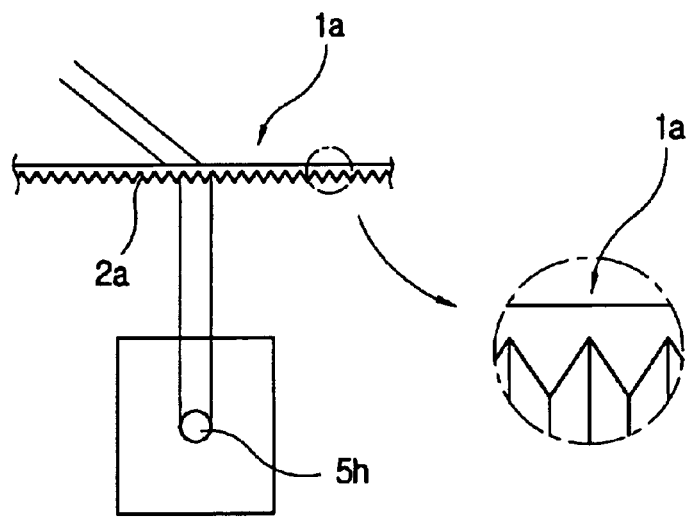

[Fig. 11A]
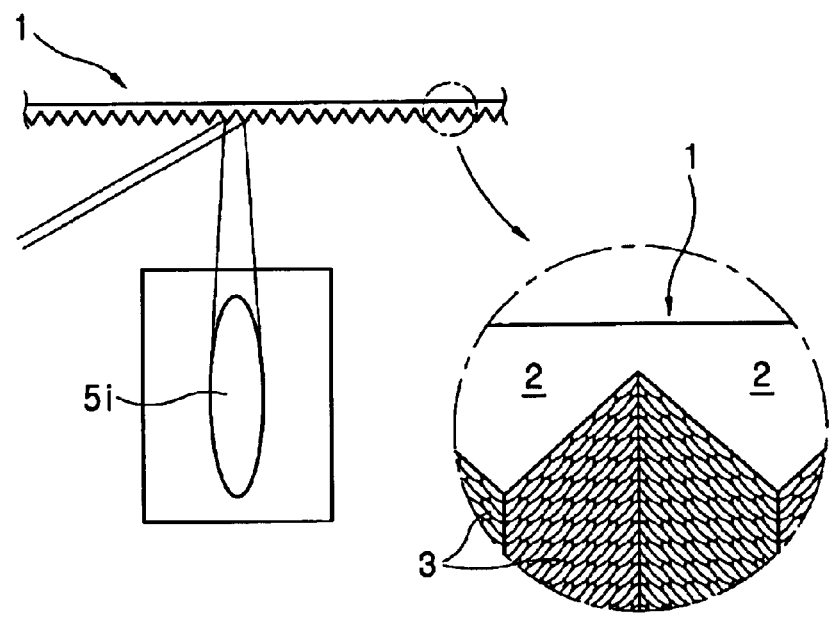
[Fig. 11B]
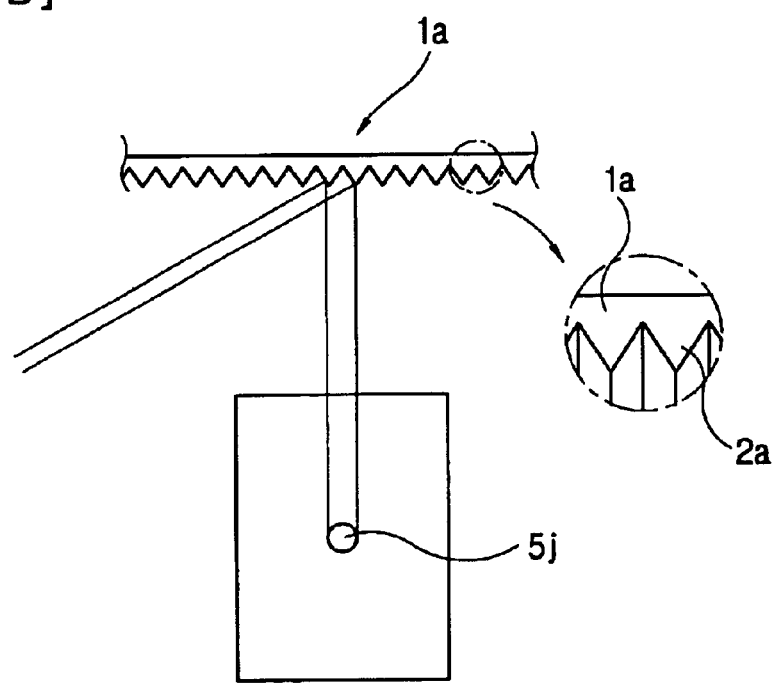

[Fig. 12A]
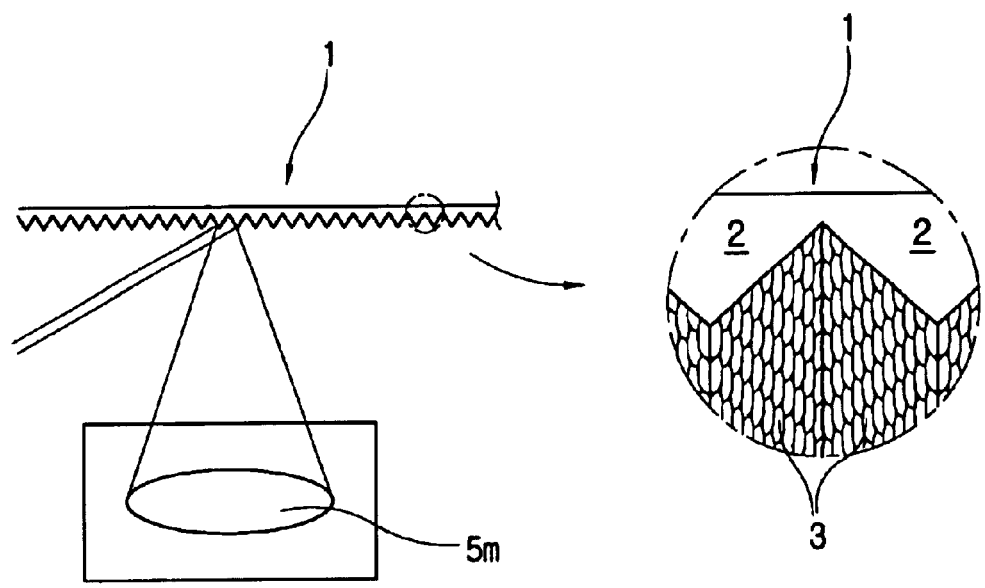
[Fig. 12B]
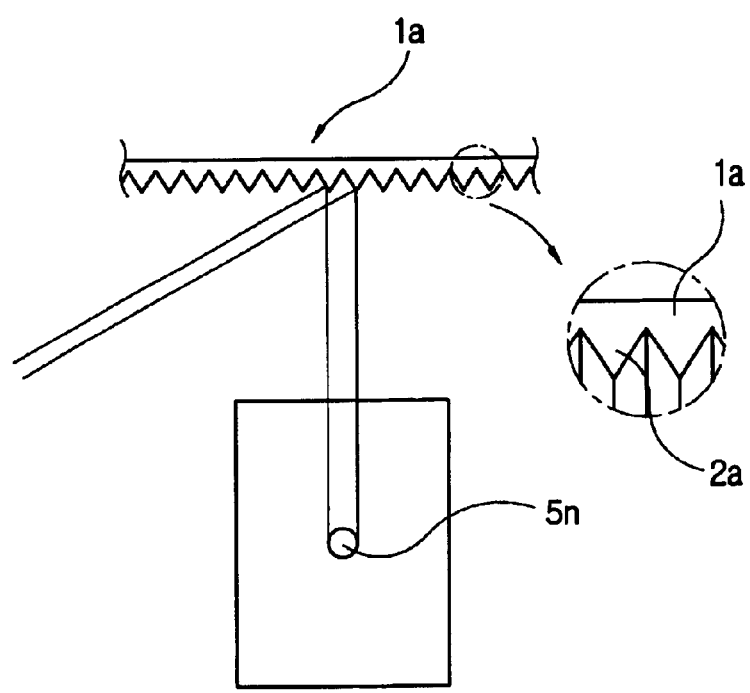

[Fig.13]
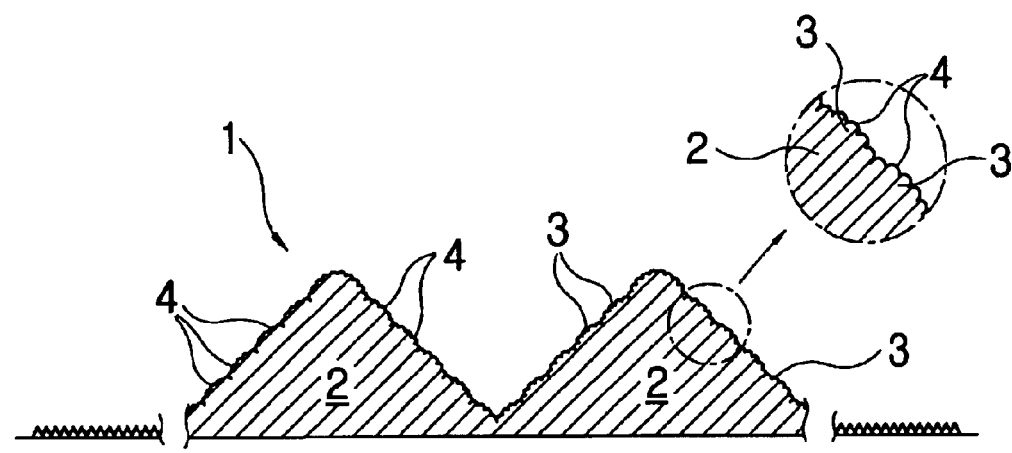
[Fig.14]
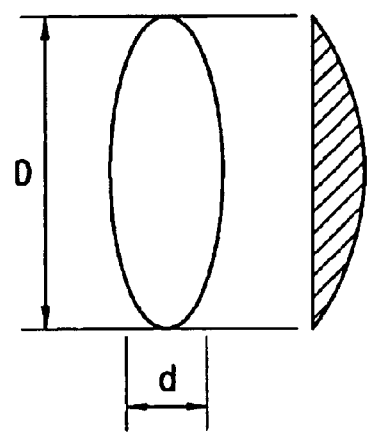

[Fig.15A]
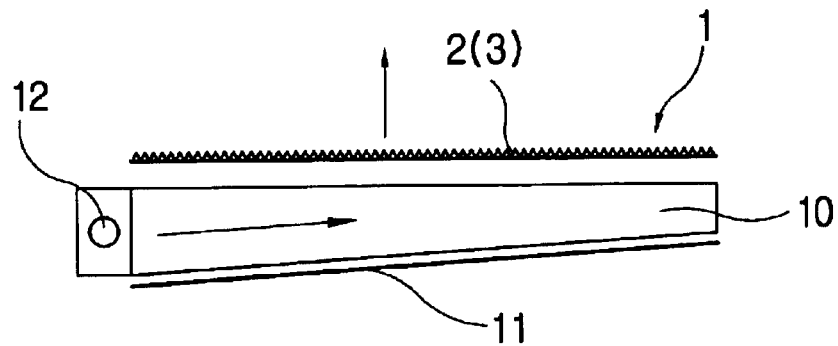
[Fig.15B]
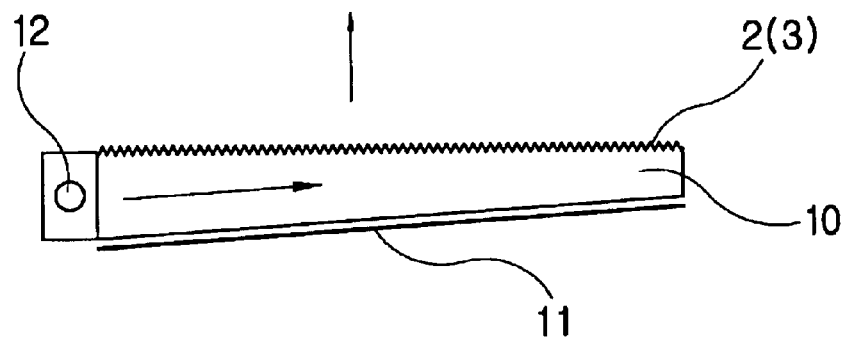
[Fig.15C]
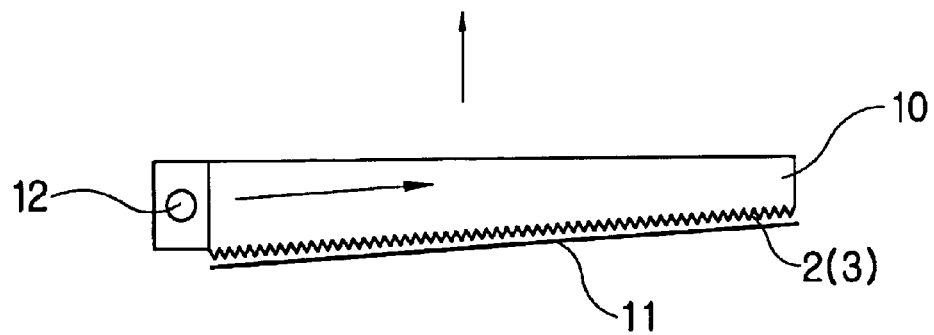

[Fig. 16A] PRIOR ART
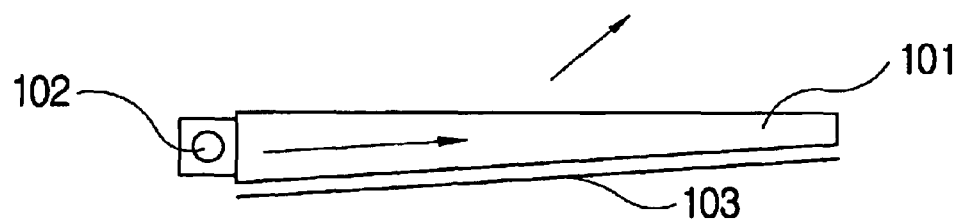
[Fig. 16B] PRIOR ART
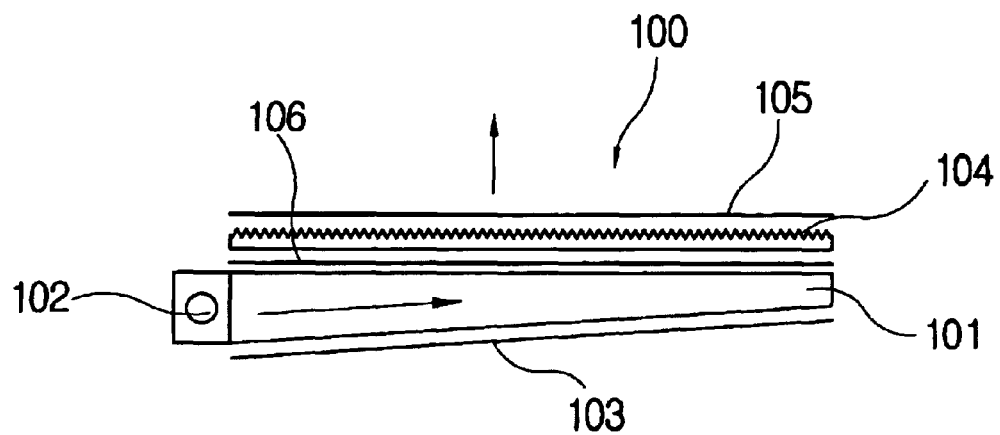

PRISM DIFFUSER FOR DIFFRACTING AND SPREADING LIGHT

This application is the national phase under 35 U.S.C. §371 of PCT International Application No. PCT/KR02/00020 which has an International filing date of Jan. 7, 2002, which designated the United States of America.

BACKGROUND OF THE INVENTION

1. Technical Field

The present invention relates to a prism diffuser for diffracting and spreading light, and in particular to a prism diffuser for diffracting and spreading light which is capable of spreading light in a certain direction(the light is spread in a wider elliptical direction and the light is narrowly spread in an orthogonal direction) at a wider angle based on a structure combined with a prism capable of diffracting light on a surface of a medium formed of a glass which transmits or reflect light, a film formed of a transparent synthetic resin material or a metallic plate and a diffuser capable of spreading light and diffracting, spreading and transmitting light into two directions or diffracting, spreading and reflecting light in one direction.

2. Background Art

Generally, since an object through which light transmits or an object which reflects light like a mirror has a small diffracting angle, the transmission and reflection range of light is narrow. In addition, as the width of a light transmission is decreased, the light transmission and reflection range is narrow and bright, and as the width of the light transmission is increased, the light transmission and reflection range is wide and unclear.

Therefore, in order to wide the transmission and reflection range of light, it is suggested to form a small protrusion structure on one surface of a glass, film and metal. The above-described method has an advantage in that the refracting angle of light is increased, and the transmission and reflection angle of light is increased. However, the above method decreases a transmission ratio of light, so that the transmitted and reflected light is unclear.

DISCLOSURE OF THE INVENTION

Accordingly, it is an object of the present invention to provide a prism diffuser for diffracting and spreading light which overcomes the problems encountered in the conventional art.

It is another object of the present invention to provide a prism diffuser for diffracting and spreading light which is capable of diffracting a transmitted and reflected light in a certain direction wherein a transmitted and reflected light is spread and concentrated in a diffracted region and is lighted up in a spread state.

It is still another object of the present invention to provide a prism diffuser for diffracting and spreading light which is capable of diffracting and spreading light in two directions or intensively diffracting in one direction for thereby transmitting or reflecting the light.

To achieve the above objects, there is provided a prism diffuser for diffracting and spreading light which includes a medium formed of a material capable of transmitting or reflecting light, a light diffracting member in which a plurality of fine protrusion surfaces of a micron unit are continuously connected on one surface of the medium, and the neighboring fine protrusion surfaces are formed in parallel in a certain direction for thereby diffracting light, and a light spreading protrusion member which is formed in a micron unit size greatly smaller than a width and height of the light diffracting member, and a plurality of the same are continuously formed in vertical and horizontal directions on the surface of the light diffracting member and is formed in a longitudinal shape and has a long diameter and a short diameter and has a certain surface curvature for thereby effectively spreading light.

The light diffracting member includes a triangle-shaped cross section in a prism shape.

The light diffracting member is a cylindrical shape lens member in which a continuous cross section forms a waveform.

The light spreading protrusion members are arranged in such a manner that the long diameters of the light spreading protrusion members are formed in a protrusion slanted direction of the light diffracting member.

The light spreading protrusion members are arranged in such a manner that the long diameter directions of the light spreading members are formed in a direction parallel with respect to the longitudinal direction of the light diffracting member.

A plurality of fine light spreading protrusion members each having a width and height of a fine unit smaller than that of the light spreading member are protruded.

BRIEF DESCRIPTION OF THE DRAWINGS

The present invention will become better understood with reference to the accompanying drawings which are given only by way of illustration and thus are not limitative of the present invention, wherein;

FIG. 1 is a partial enlarged perspective view illustrating a prism diffuser combined with a diffracting structure and a spreading structure according to an embodiment of the present invention;

FIG. 2 is an enlarged cross-sectional view taken along line A—A according to the embodiment of FIG. 1;

FIGS. 3 through 5 are views illustrating partial enlarged cross-sectional views illustrating other embodiments of the present invention;

FIG. 6 is a partial enlarged perspective view illustrating a prism diffuser combined with a diffracting structure and a spreading structure according to another embodiment of the present invention;

FIGS. 7A and B through FIGS. 12A and B are views illustrating a light transmission or diffraction and spreading state of light using a medium combined with a diffracting structure and a refracting structure according to the present invention and a light transmission or refraction state of light of a conventional prism plate according to the present invention;

FIG. 13 is a partial enlarged cross-sectional view illustrating a dual structure spreading structure according to the present invention;

FIG. 14 is a plan and cross-sectional view of a spreading structure according to the present invention;

FIG. 15A is a view illustrating an embodiment in which a medium combined with a diffracting structure and a spreading structure according to the present invention is adapted to a LCD back light, and FIGS. 15B and C are embodiments in which a diffracting structure and a spreading structure are adapted to a LCD back light according to the present invention; and FIGS. 16A and 16B are views for explaining a conventional LCD light guide plate and back light set structure.

MODES FOR CARRYING OUT THE PREFERRED EMBODIMENTS

The preferred embodiments of the present invention will be explained with reference to the accompanying drawings.

FIG. 1 is a partial enlarged perspective view illustrating a prism diffuser combined with a diffracting structure and a spreading structure according to an embodiment of the present invention, FIG. 2 is an enlarged cross-sectional view taken along line A—A according to the embodiment of FIG. 1, FIGS. 3 through 5 are views illustrating partial enlarged cross-sectional views illustrating other embodiments of the present invention, FIG. 6 is a partial enlarged perspective view illustrating a prism diffuser combined with a diffracting structure and a spreading structure according to another embodiment of the present invention, FIGS. 7A and B through FIGS. 12A and B are views illustrating a light transmission or diffraction and spreading state of light using a medium combined with a diffracting structure and a refracting structure according to the present invention and a light transmission or refraction state of light of a conventional prism plate according to the present invention, FIG. 13 is a partial enlarged cross-sectional view illustrating a dual structure spreading structure according to the present invention, FIG. 14 is a plan and cross-sectional view of a spreading structure according to the present invention, FIG. 15A is a view illustrating an embodiment in which a medium combined with a diffracting structure and a spreading structure according to the present invention is adapted to a LCD back light, and FIGS. 15B and C are embodiments in which a diffracting structure and a spreading structure are adapted to a LCD back light according to the present invention.

As shown therein, reference numeral 1 represents a medium. The medium 1 may be formed a material through which light transmits, like a glass, transparent synthetic resin film, etc. or may be formed of a material like a metal, etc. capable of reflecting light, not transmitting the same.

The medium 1 is formed by selecting the material among a material capable of transmitting light or a material capable of reflecting light based on the purpose of use.

A plurality of light diffracting members 2 each having a micron unit height is formed on one surface of the medium 1. Each of the light diffracting members 2 is continuously connected in their protruded surfaces, and the neighboring light diffracting members 2 are formed in parallel in a longitudinal direction.

The light diffracting members 2 formed on one surface of the medium 1 are formed in a prism shape having a triangle cross section and a cylindrical shape lens having a wave form cross section as shown in FIGS. 3 through 5.

The diffraction member 2 formed in the prism shape or the cylindrical lens member is capable of diffracting a light 5a in two directions as shown in FIG. 7A or diffracting a light 5e in one direction as shown in FIG. 9A.

The present invention is directed to forming a light spreading structure on a plurality of protruded surfaces which form the light diffraction member 2.

The light spreading structure includes a light spreading protrusion 3 which has a certain width and height which is greatly smaller than the width and height of the protruded surface of the light diffracting member 2, and a fine light spreading protrusion 4 formed in a small unit size smaller than that of the light spreading member on the surface of the same. The light spreading protrusion member 3 and the fine light spreading protrusion member 4 are capable of widely spreading the light diffracted into two directions or one direction by the light diffraction member 2 based on the directivity and the field of vision of the light.

As shown in FIG. 14, the light spreading and fine light spreading members 3 and 4 are preferably formed in an elliptical shape or a streamline shape and have a long diameter D and a small diameter d. A certain member which has a curvature capable of spreading light may be adapted.

The light spreading protrusion member 3 and the fine light spreading protrusion member 4 are formed in a direction in such a manner that the long diameter directions of the same are arranged in the direction that the protruded surfaces which are the light diffracting member 2 are parallel or are arranged in the direction of the slanted direction of the protruded surface as a direction which is orthogonal thereto for thereby determining the directivity and the field of vision of the light.

Here, the directivity represents that the light is spread in a longitudinal direction like an elliptical or streamline shape having a long diameter D and a short diameter d, not in a circular shape when the light transmits or is reflected by the light diffraction member 2 and the light spreading protrusion members 3 and 4. In addition, the field of vision represents that a light is widely spread based on a directivity and lights up an object more widely and brighter.

FIGS. 7A through 12B are views illustrating a difference between the present invention and the conventional art by transmitting and reflecting light to a medium 1 which combines the light spreading protrusion member 3 into each protrusion surface(prism structure) which is the light diffracting member 2 and a medium 1a formed in the conventional prism structure 2a which has a simple protrusion shape.

FIG. 7A is a view illustrating an embodiment with respect to the medium 1 in which the long diameter direction of the light spreading protrusion member 3 is formed in a slanted direction of the protrusion surface which is the light diffracting member 2. At this time, if the light is irradiated in a direction in which the light diffracting member 2 and the light spreading protrusion member 3 are formed, the light is divided into two directions by the light diffracting member 2 and is diffracted and has a field of vision in which the light is widely spread based on the directivity that the light is extended in a direction by the light spreading protrusion member 3. At this time, the two-direction lighting portions 5a have a directivity which is longitudinally formed in the upper and lower directions toward the direction which is orthogonal with respect to the long diameter of the light spreading protrusion member 3.

FIG. 8A is an embodiment with respect to the medium 1 in which a long diameter direction of the light spreading protrusion member 3 is in the longitudinal direction of the protrusion surface which is the light diffracting member 2. In the above embodiment of the present invention, when irradiating the light from one side in which the light diffracting member 2 and the light spreading protrusion member 3 are formed, the light is divided into two directions by the light diffracting member 2 and forms two-direction lighting portions 5c based on a field of vision which is widely spread based on a directivity by the light spreading protrusion member 3. At this time, the directivity of the two-direction lighting portion 5c is formed in the direction orthogonal with respect to the long diameter direction of the light spreading protrusion member 3 and has the directivity in which the long diameter of the two-direction lighting portion 5c is longitudinally formed in the horizontal direction and is spread in a spread state.

When irradiating the light to the medium 1a in which the conventional prism structure 2a is formed as shown in FIGS. 7B and 8B, the light is diffracted into two directions by the prism structure 2a and forms the two-direction lighting portions 5b and 5d. Each of the two-direction lighting portions 5b and 5d do not have a directivity and is not widely spread.

In another embodiment, as shown in FIG. 9A, when irradiating a light from a flat surface which does not have a protrusion using the same medium 1 as the embodiment of FIG. 7A, the light being incident into the back surface of the medium is refracted into one direction by the light diffracting member 2 and is diffracted based on a field of vision in which the light is widely spread based on the directivity in which the light is longitudinally formed by the light spreading protrusion member 3. The directivity of the lighting portion 5e is orthogonal with resect to the long diameter of the light spreading protrusion member 3, namely, the long diameter of the lighting portion 5e formed on the screen is formed in the upper and lower portions.

FIG. 10A is a view of an embodiment in which a light is irradiated from the back surface using the medium 1 in which the long diameter direction of the light spreading protrusion member 3 as shown in FIG. 8A is formed in the direction of the protrusion surface of the light diffracting member 2. The light being incident into the back surface of the medium 1 is diffracted in the direction 1 by the light diffracting member 2 and is diffracted based on a field of vision in which the light is widely spread based on the directivity that the light is longitudinally formed by the light spreading member 3. At this time, the directivity of one lighting portion 5g is diffracted in the direction orthogonal with respect to the long diameter of the light spreading member 3.

As shown in FIGS. 9B and 10B, in the case of the medium 1a in which only the conventional prism structure 2a is formed, when irradiating the light from the back surface, the light is refracted in one direction by the prism structure 2a and forms lighting portions 5f and 5h. The lighting portions 5f and 5h are formed in a small circle and do not have a directivity and is not widely spread.

FIGS. 11A and 12A are views illustrating an embodiment (FIG. 11A) in which the long diameter direction of the light spreading protrusion member 3 is formed in a slanted direction of the protrusion surface of the light diffracting member 2 when forming the light diffracting member 2 and the light spreading protrusion member 3 on the reflection surface of the medium 1 which reflects light and an embodiment(FIG. 12A) in which the light is formed in the direction parallel with respect to the longitudinal direction of the protrusion surface. As shown therein, when irradiating light as an incident angle slanted with respect to the front side of the surface in which the protrusions are formed, the light is reflected and have one-direction lighting portions 5l and 5m. At this time, the one-direction lighting portions 5l and 5m have a directivity orthogonal with respect to the long diameter of the light spreading protrusion member 3 and is diffracted based on a field of vision in which the light is widely spread.

FIGS. 11B and 12B are views illustrating the conventional construction in which only the prism structure 2a is formed on the reflection surface of the medium 1a which reflects light. As shown therein, the light which is irradiated from a slanted surface of the prism structure 2a is refracted and reflected in one direction, and the one-direction lighting portions 5j and 5n are formed in a small circle, so that the light does not have a directivity as well as is not widely spread.

FIG. 13 is a view illustrating a medium 1 in which a plurality of fine and light spreading members 3 each having a width and height smaller than that of the light spreading protrusion member are formed on the surface of the light spreading member 3 which is formed in the vertical and horizontal directions on the protrusion surface which is the light diffracting member 2. As shown therein, when forming the fine light spreading protrusion member 4 on the surface of the light spreading protrusion member 3, the light spread from the light spreading protrusion member 3 is re-spread by the fine light spreading protrusion member 4.

A result of lighting between the embodiment in which the medium 1 according to the present invention is adapted to a LCD back light which operates lighting of a notebook computer and the conventional LCD back light set structure will be explained.

First, the conventional back light set structure will be explained. FIG. 16A is an initial structure of the light guide 101. As shown therein, when irradiating light from a light source 102 installed in a lateral side of the light guide 101, the thusly irradiated light is refracted in the opposite direction of the reflection plate 103. At this time, the refraction direction is formed in the direction of the arrow, so that the light is spread outwardly. Therefore, in this case, it is impossible to brightly irradiate the screen of the LCD installed on the surface of the light guide 101. In order to overcome the above problems, a back light set structure 100 in which the prism plate 104 and the upper and lower diffuser plates 105 and 106 are engaged is installed on the light guide 101 as shown in FIG. 16B. In the above construction, the light irradiated from the light source 102 is refracted by the light guide and is diffracted in the vertical direction as indicated by the arrow by the lower diffuser plate 106, the prism plate 104 and the upper diffuser plate 105 for thereby lighting the screen of the LCD. In this case, since the back light set structure 100 is formed of the light guide 101, the prism plate 104 and the upper and lower diffuser plates 105 and 106 in the multiple structure, the construction of the same is complicated, and the thickness is increased. In addition, the light is bright in the center portion, and the brightness is sharply decreased from the center portion to the edge portion, so that the clearness of the screen of the computer is not uniform.

FIG. 15A is a view illustrating the structure that a medium 1 in which the light diffracting member 2, the light spreading protrusion member 3 and the fine light spreading protrusion member 4 are formed on one surface is installed on the surface of the light guide 10 in which the reflection plate 11 is installed. In the above embodiment, it is possible to diffract and spread the light irradiated from the light source 12 installed in lateral side of the light guide 10 in the direction of the medium 1, and it is possible to diffract and spread the light diffracted by the light guide 10 in a desired direction by forming the long diameter direction of the light spreading protrusion member 3 and the fine light spreading member 4 in a slanted direction or a longitudinal direction or other directions of the protrusion surface which is the diffracting structure 2. In addition, it is possible to uniformly light up light, so that the screen of the LCD is more clearly lighted.

As shown in FIGS. 15B and C, the light diffracting member 2 and the spreading protrusion members 3 and 4 according to the present invention may be integrally formed on the upper surface or the lower surface of the light guide 10 for thereby maximizing the simplicity of the structure. In the case that the diffracting and spreading structures are directly adapted to the upper surface or the lower surface of the light guide 10, it is possible to diffract the light irradiated from the lateral side of the light guide 10 in a desired direction for thereby implementing a wider spreading effect.

As described above, in the present invention, it is possible to enhance a light diffracting and spreading effect using a light diffracting member having a micron unit protrusion surface which is capable of diffracting and spreading light with respect to a glass and a synthetic resin film through which light passes and a metal by which light is reflected, and one medium which forms a light spreading protrusion of a protrusion shape having a micron unit which is greatly smaller than the width and height of the light diffracting member on the protrusion surface of the light diffracting member for thereby diffracting and spreading the light at wider field of vision based on a certain directivity. In addition, in the present invention, a fine light spreading protrusion member of a fine unit is formed on the protrusion surface of the light spreading member for thereby maximizing the spreading effect. When the present invention is adapted to a screen of a notebook computer or an outdoor advertisement plate, it is possible to irradiate more brightly using a small power consumption.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A prism diffuser capable of diffracting and spreading light, comprising:
   a medium formed of a material capable of transmitting or reflecting light;
   a light diffracting member in which a plurality of fine protrusion surfaces of a micron unit are continuously connected on one surface of the medium, and the neighboring fine protrusion surfaces are formed in parallel in a certain direction for thereby diffracting light; and
   a light spreading protrusion member which is formed in a micron unit size greatly smaller than a width and height of the light diffracting member, and a plurality of the same are continuously formed in vertical and horizontal directions on the surface of the light diffracting member and is formed in a longitudinal shape and has a long diameter and a short diameter and has a certain surface curvature for thereby effectively spreading light.

2. A prism diffuser of claim 1, wherein said light diffracting member includes a triangle-shaped cross section in a prism shape.

3. A prism diffuser of claim 1, wherein said light diffracting member is a cylindrical shape lens member in which a continuous cross section forms a waveform.

4. A prism diffuser of claim 1, wherein said light spreading protrusion members are arranged in such a manner that the long diameters of the light spreading protrusion members are formed in a protrusion slanted direction of the light diffracting member.

5. A prism diffuser of claim 1, wherein said light spreading protrusion members are arranged in such a manner that the long diameter directions of the light spreading members are formed in a direction parallel with respect to the longitudinal direction of the light diffracting member.

6. A prism diffuser of claim 1, wherein a plurality of fine light spreading protrusion members each having a width and height of a fine unit smaller than that of the light spreading member are protruded.

* * * * *